US012694475B2

(12) United States Patent
Suzuki

(10) Patent No.: US 12,694,475 B2
(45) Date of Patent: Jul. 28, 2026

(54) IMAGE CAPTURING APPARATUS, IMAGE CAPTURING SYSTEM, METHOD, AND NON-TRANSITORY COMPUTER READABLE STORAGE MEDIUM

(71) Applicant: CANON KABUSHIKI KAISHA, Tokyo (JP)

(72) Inventor: Taito Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 327 days.

(21) Appl. No.: 18/329,725

(22) Filed: Jun. 6, 2023

(65) Prior Publication Data

US 2023/0410258 A1      Dec. 21, 2023

(30) Foreign Application Priority Data

Jun. 17, 2022     (JP) ................................. 2022-098197

(51) Int. Cl.
*G06T 3/60*          (2024.01)
*G06F 3/14*          (2006.01)
*G06T 5/50*          (2006.01)

(52) U.S. Cl.
CPC .................. *G06T 3/60* (2013.01); *G06F 3/14* (2013.01); *G06T 5/50* (2013.01); *G06T 2207/20221* (2013.01)

(58) Field of Classification Search
CPC ... G06T 3/60; G06T 5/50; G06T 2207/20221; G06F 3/14; H04N 23/661; H04N 23/695
See application file for complete search history.

(56) References Cited

U.S. PATENT DOCUMENTS

| | | | |
|---|---|---|---|
| 2007/0040910 A1* | 2/2007 | Kuwata | B60R 1/008 |
| | | | 348/148 |
| 2007/0157084 A1* | 7/2007 | Yano | H04N 1/00453 |
| | | | 715/234 |
| 2013/0120606 A1* | 5/2013 | Iwasaki | H04N 23/00 |
| | | | 348/222.1 |
| 2022/0182528 A1* | 6/2022 | Mitani | H04N 23/741 |

FOREIGN PATENT DOCUMENTS

| | | | | |
|---|---|---|---|---|
| JP | | 5235910 B2 | 7/2013 | |
| JP | | 6165376 B | 7/2017 | |
| WO | WO-2011083547 A1 * | | 7/2011 | ............. H04N 23/63 |

\* cited by examiner

*Primary Examiner* — Mekonen T Bekele
(74) *Attorney, Agent, or Firm* — Cowan, Liebowitz & Latman, P.C.

(57) ABSTRACT

There is provided with an image capturing apparatus. An output unit outputs a first output image and a second output image based on an image capture result of the subject by the image capturing unit. The output unit, in a case where a predetermined condition including that an image capturing direction of the image capturing unit is within a predetermined range is satisfied, outputs a first image in which the image capturing unit has captured the subject as the first output image, and a second image in which the first image has been rotated as the second output image.

14 Claims, 11 Drawing Sheets

F I G. 1
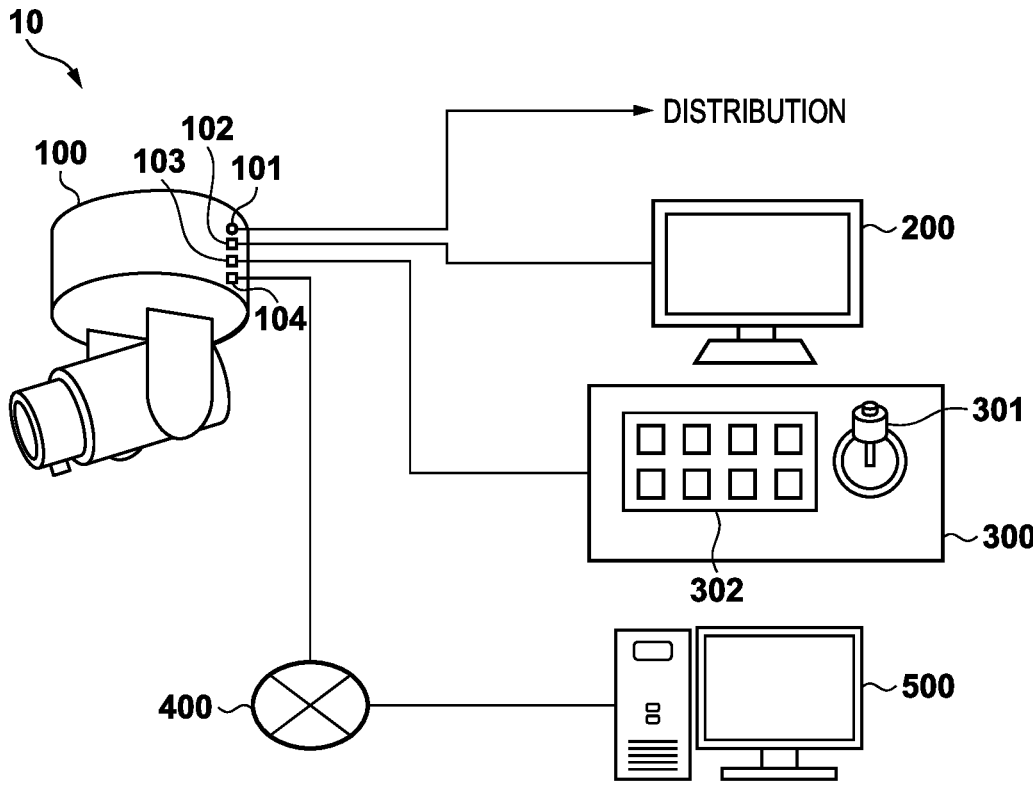

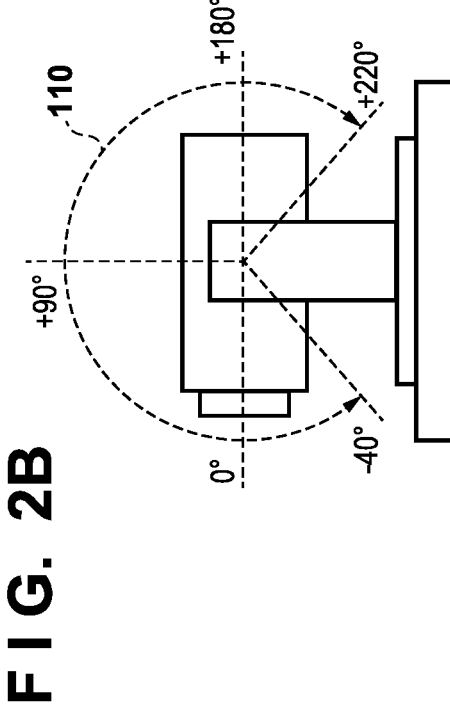
FIG. 2B
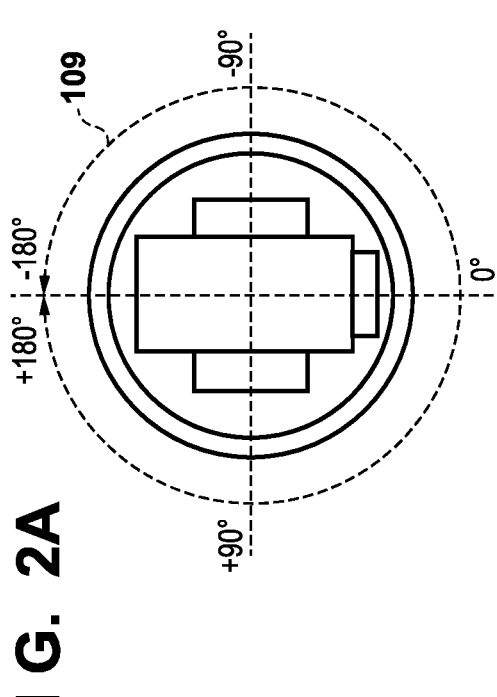
FIG. 2A
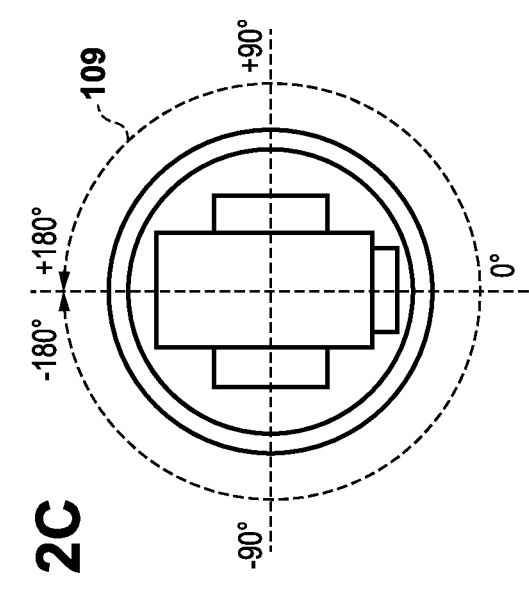
FIG. 2D
FIG. 2C

F I G. 6

| INSTALLATION STATE | PT COORDINATE SYSTEM | TILT VALUE θt | VIDEO FOR DISTRIBUTION 180° ROTATION |
|---|---|---|---|
| ON-GROUND INSTALLATION | UPRIGHT | θt ≤ 80° | OFF |
| | | 80°≤ θt ≤100° | STATE MAINTAINED |
| | | 100°≤ θt | ON |
| | INVERTED | θt ≤ -100° | ON |
| | | -100°≤ θt ≤ -80° | STATE MAINTAINED |
| | | -80°≤ θt | OFF |
| CEILING INSTALLATION | UPRIGHT | θt ≤ 80° | ON |
| | | 80°≤ θt ≤100° | STATE MAINTAINED |
| | | 100°≤ θt | OFF |
| | INVERTED | θt ≤ -100° | OFF |
| | | -100°≤ θt ≤ -80° | STATE MAINTAINED |
| | | -80°≤ θt | ON |

F I G.  8
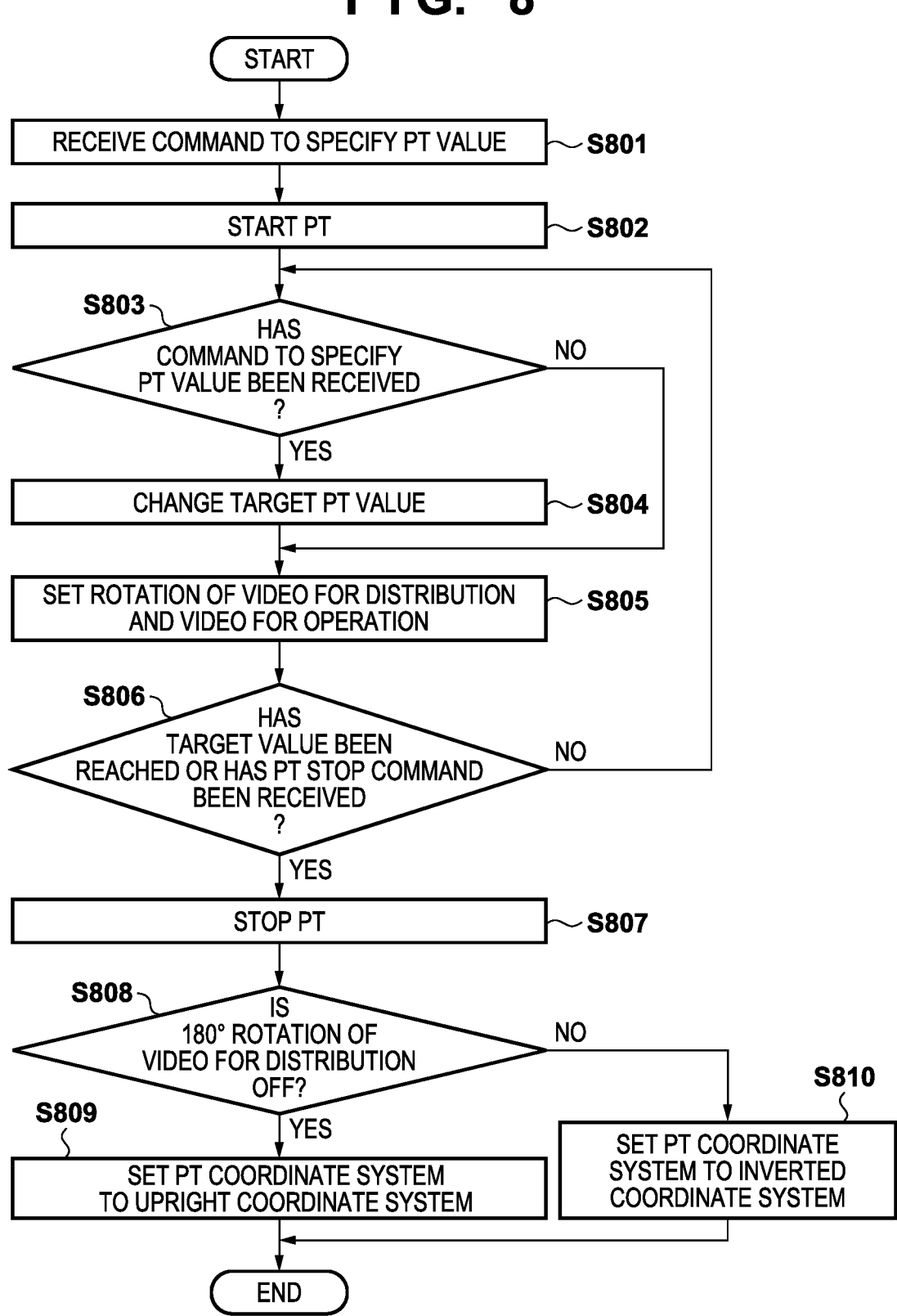

F I G. 10

| HEADER | COMMAND | PARAMETER 1 | ... | PARAMETER N |
|--------|---------|-------------|-----|-------------|

F I G. 11

| COMMAND | PARAMETER 1 | PARAMETER 2 |
|---------|-------------|-------------|
| PAN DIRECTION | DIRECTION (LEFT OR RIGHT) | SPEED |
| TILT DIRECTION | DIRECTION (UP OR DOWN) | SPEED |
| PT VALUE | PAN VALUE | TILT VALUE |
| STOP PT | — | — |
| PRESET REGISTRATION | PRESET NUMBER | — |
| PRESET CALL | PRESET NUMBER | — |

F I G. 12

IMAGE CAPTURING APPARATUS, IMAGE CAPTURING SYSTEM, METHOD, AND NON-TRANSITORY COMPUTER READABLE STORAGE MEDIUM

BACKGROUND OF THE INVENTION

Field of the Invention

The present invention relates to an image capturing apparatus, an image capturing system, a method, and a non-transitory computer readable storage medium.

Description of the Related Art

PTZ cameras (hereinafter referred to as "image capturing apparatuses") capable of changing pan, tilt, and zoom are used in the field of video production. An external control apparatus (hereinafter referred to as a controller) is connected to an image capturing apparatus by a cable. A user can remotely operate the PTZ of the image capturing apparatus by operating a joystick of the controller. As a result, the user can capture an image of a subject while changing the image capturing direction of the image capturing apparatus. The image capturing apparatus may be installed on a ceiling, for example. In such a case, when the image capturing apparatus captures a subject in a predetermined tilt direction away from the vertical direction, the subject of the captured video is captured in a state in which it is rotated by 180° (up-down/left-right inverted). Therefore, the image capturing apparatus rotates the captured video by 180° and outputs the rotated video. The above-described output processing performed by the image capturing apparatus is referred to as an "auto-flip function".

For example, when the user operates the joystick of the controller in the downward direction, the image capturing apparatus tilts in the downward direction. Next, in a case of image capturing from a predetermined tilt direction away from the vertical direction, the image capturing apparatus rotates the captured video by 180° without changing a PT coordinate system. Then, the user will see that the image capturing range within the video moves in the upward direction while the user operates the joystick in the downward direction. That is, the direction in which the user operates the joystick (downward direction) and the direction in which the image capturing range in the video moves (upward direction) are opposite to each other. Therefore, the user will feel that it is difficult to control the image capturing apparatus in the image capturing direction intended by the user.

In view of the problem described above, by rotating the video by 180° and inverting the PT coordinate system, it is possible to prevent the image capturing apparatus from being oriented in an image capturing direction that is not intended by the user. When a video is rotated by 180°, a user is notified that the video has been rotated by using an intermediate video in which the video has been rotated by 0° or more and less than 180° (Japanese Patent No. 6165376 and Japanese Patent No. 5235910).

SUMMARY OF THE INVENTION

According to the present invention, it is possible to provide an image capturing apparatus that can control an image capturing direction intended by a user even in a case where auto-flipping of a video occurs when the image capturing direction of the image capturing apparatus is changed based on a user operation.

The present invention in its aspect provides an image capturing apparatus comprising an image capturing unit configured to capture a subject, at least one processor, and at least one memory coupled to the at least one processor, the memory storing instructions that, when executed by the processor, cause the processor to act as an output unit configured to output a first output image and a second output image based on an image capture result of the subject by the image capturing unit, wherein the output unit, in a case where a predetermined condition including that an image capturing direction of the image capturing unit is within a predetermined range is satisfied, outputs a first image in which the image capturing unit has captured the subject as the first output image, and a second image in which the first image has been rotated as the second output image.

The present invention in its one aspect provides a method comprising outputting a first output image and a second output image based on an image capture result of the subject by an image capturing unit, wherein in a case where a predetermined condition including that an image capturing direction of the image capturing unit is within a predetermined range is satisfied, outputting a first image in which the image capturing unit has captured the subject as the first output image, and a second image in which the first image has been rotated as the second output image.

The present invention in its one aspect provides a non-transitory computer-readable storage medium storing instructions that, when executed by a computer, cause the computer to perform a method comprising outputting a first output image and a second output image based on an image capture result of the subject by an image capturing unit, wherein in a case where a predetermined condition including that an image capturing direction of the image capturing unit is within a predetermined range is satisfied, outputting a first image in which the image capturing unit has captured the subject as the first output image, and a second image in which the first image has been rotated as the second output image.

Further features of the present invention will become apparent from the following description of exemplary embodiments (with reference to the attached drawings).

BRIEF DESCRIPTION OF THE DRAWINGS

FIG. 1 is a schematic view of an image capturing system according to a first embodiment.

FIG. 2A is a view for describing an image capturing direction of an image capturing apparatus according to the first embodiment.

FIG. 2B is a view for describing an image capturing direction of an image capturing apparatus according to the first embodiment.

FIG. 2C is a view for describing an image capturing direction of an image capturing apparatus according to the first embodiment.

FIG. 2D is a view for describing an image capturing direction of an image capturing apparatus according to the first embodiment.

FIG. 6 is view illustrating an auto-flip setting for a video for distribution according to the first embodiment.

FIG. 8 is a flowchart for describing auto-flipping according to the first embodiment.

FIG. 10 is a view illustrating a packet structure used in the control communication according to the first embodiment.

FIG. 11 is a view illustrating a command list used in the control communication according to the first embodiment.

FIG. 12 is a view for describing a hardware configuration of an image capturing apparatus according to the first embodiment.

DESCRIPTION OF THE EMBODIMENTS

Figure 3:
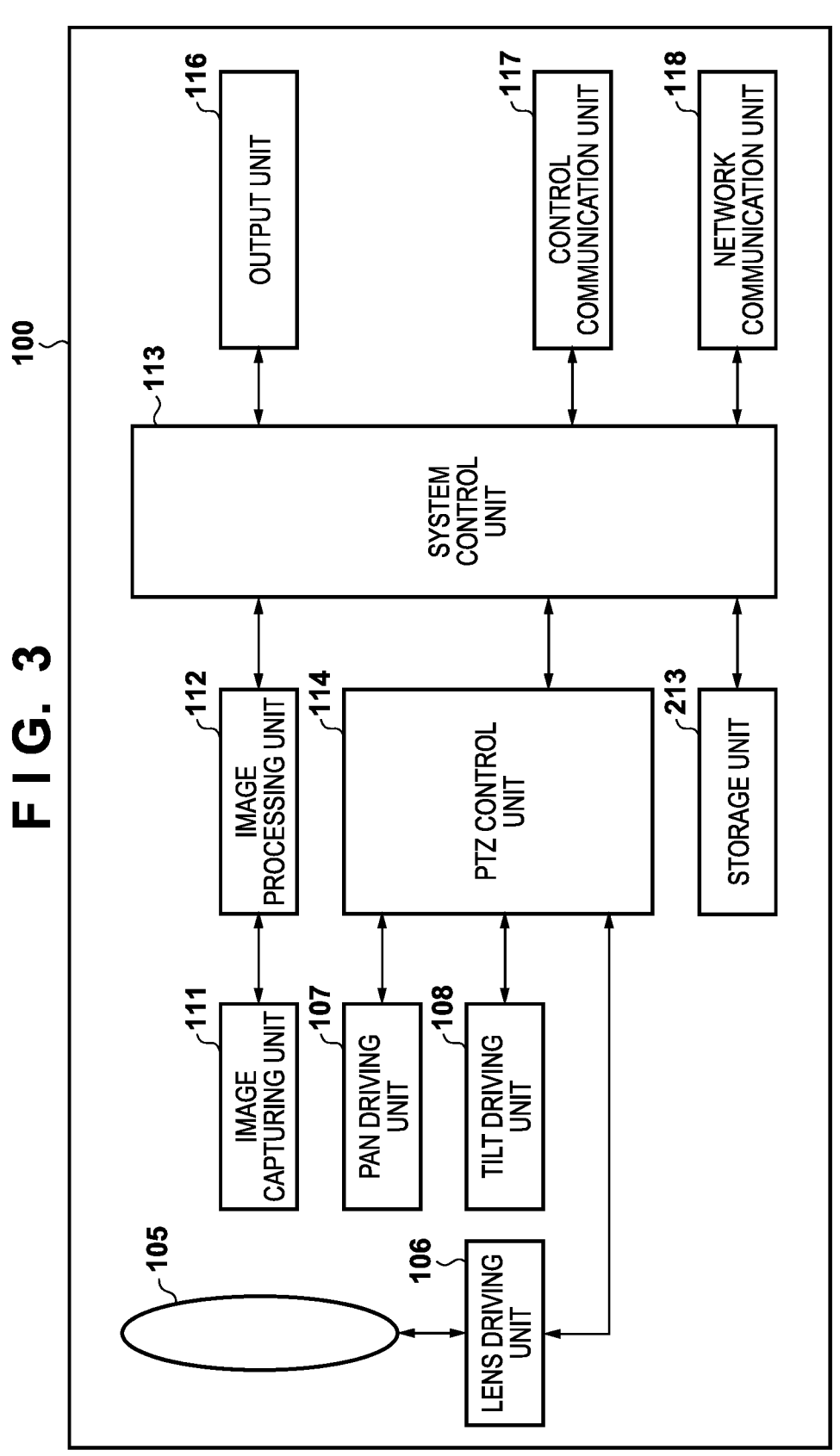
FIG. 3 is a block diagram for describing functions of the image capturing apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An image capturing apparatus captures an image of a subject, and outputs a first output image and a second output image based on a result of capturing the subject by an image capturing unit. In a case where a predetermined condition including that the image capturing direction of the image capturing unit is within a predetermined range is satisfied, the image capturing apparatus outputs a first image in which the image capturing unit captured the subject as a first output image and a second image in which the first image has been rotated as a second output image.

FIG. 1 is a schematic view of an image capturing system according to a first embodiment.

An image capturing system 10 is a system that captures an image of a subject. The image capturing system 10 includes an image capturing apparatus 100, a display apparatus 200, a controller 300, a network 400, and an information processing apparatus 500.

The image capturing apparatus 100 is an apparatus that captures an image of a subject, and is, for example, a PTZ camera. The image capturing apparatus 100 includes a first output terminal 101, a second output terminal 102, a control communication terminal 103, and an I/F 104.

The first output terminal 101 and the second output terminal 102 are terminals for outputting a video captured by the image capturing apparatus 100. The first output terminal 101 and the second output terminal 102 are terminals conforming to the standards of a Serial Digital Interface (SDI) and HDMI (registered trademark), for example. Further, the first output terminal 101 and the second output terminal 102 may be Ethernet (registered trademark) terminals that output a video by packetizing the video according to Internet Protocol (IP).

The control communication terminal 103 is a communication terminal that receives a control signal and a control command from the controller 300 and transmits a response signal to the controller 300. The control communication terminal 103 is, for example, a contact terminal that transmits a High/Low signal. The control communication terminal 103 is a terminal conforming to a serial communication standard such as RS-232C or the communication standard of Ethernet (registered trademark).

The I/F 104 is a terminal for communicating with the information processing apparatus 500 via the network 400. The I/F 104 is, for example, an Ethernet (registered trademark) terminal or a Wi-Fi (registered trademark) transmission/reception module.

The display apparatus 200 is an apparatus that displays a video, and is, for example, a liquid crystal display or an organic EL display. The display apparatus 200 displays a video from the image capturing apparatus 100 onto a screen.

The controller 300 (corresponding to an accepting unit) is an apparatus that controls pan, tilt, and zoom (PTZ) of the image capturing apparatus 100 based on an input of operations by the user. The controller 300 includes a joystick 301 and control buttons 302.

The joystick 301 is an apparatus that controls PTZ of the image capturing apparatus 100. The controller 300 transmits an instruction (control command) for panning leftward when the joystick 301 tilts in the leftward direction to the image capturing apparatus 100 via the control communication terminal 103. The controller 300 transmits an instruction (control command) for tilting in the upward direction when the joystick 301 tilts up to the image capturing apparatus 100 via the control communication terminal 103. Note, the controller 300 transmits the pan and tilt speeds corresponding to the tilt angle of the joystick 301 at the same time as the above-described control command.

Further, the user can change the zoom of the image capturing apparatus 100 by rotating the joystick 301. For example, the controller 300 transmits a zoom-in instruction (control command) to the image capturing apparatus 100 when the joystick 301 rotates clockwise. On the other hand, the controller 300 transmits a zoom-out instruction (control command) to the image capturing apparatus 100 when the joystick 301 rotates counterclockwise.

The control buttons 302 have buttons for registering PTZ values of the image capturing apparatus 100 and for controlling the image capturing apparatus 100 to the registered PTZ values. Upon receiving an instruction to register the PTZ values, the image capturing apparatus 100 stores a preset in which the PTZ values and the identification number (for example, No. 1 and No. 2) are associated with each other. When the user presses the control buttons 302, the controller 300 registers the PTZ values in the image capturing apparatus 100 or transmits an instruction to drive the image capturing apparatus 100 based on the registered PTZ values to the image capturing apparatus 100.

For example, in a case where the user long-presses the "No. 1 button" of the control buttons 302, a control command for registering PTZ values of the present image capturing apparatus 100 as "Preset No. 1" is transmitted to the image capturing apparatus 100. When the user short-presses the button of "Preset No. 1" of the control buttons 302, a control command for driving the image capturing apparatus 100 based on the PTZ values registered in "Preset No. 1" is transmitted to the image capturing apparatus 100. Note, the control buttons 302 may perform control other than control for registering PTZ values of the image capturing apparatus 100 and control for driving the image capturing apparatus 100 based on the registered PTZ values.

The network 400 includes, for example, a plurality of routers, switches, cables, and the like that conform to a communication standard such as Ethernet (registered trademark). The image capturing apparatus 100 and the information processing apparatus 500 are connected to each other via the network 400. Note that the network 400 may be the Internet or a wired or wireless Local Area Network (LAN).

The information processing apparatus 500 is, for example, a client apparatus such as a personal computer (PC) that includes a display unit (screen). The information processing apparatus 500 displays a video and a User Interface (UI) from the image capturing apparatus 100 on the screen via the network 400. Further, the information processing apparatus 500 transmits various control commands based on user operations accepted via the UI to the image capturing apparatus 100.

FIGS. 2A to 2D are views for describing an image capturing direction of the image capturing apparatus according to the first embodiment. FIG. 2A is a plan view for when the image capturing apparatus is installed on the ground, as viewed from above. FIG. 2B is a left side surface view for when the image capturing apparatus is installed on the ground. FIG. 2C is a plan view for when the image capturing apparatus is installed on a ceiling, as viewed from below. FIG. 2D is a left side surface view for when the image capturing apparatus is installed on a ceiling.

The image capturing direction of the image capturing apparatus 100 is defined by a pan value, a tilt value, and a zoom value (i.e., PTZ values). Here, the pan value and the tilt value are represented by an upright coordinate system and an inverted coordinate system.

The upright coordinate system (a first coordinate system) is a coordinate system used when the image capturing apparatus 100 is panned or tilted clockwise when installed on the ground or when installed on the ceiling, as shown in the FIGS. 2A to 2D. An on-ground installation refers to, for example, installation of the image capturing apparatus 100 on a table or a tripod. A ceiling installation refers to, for example, installation of the image capturing apparatus 100 on a ceiling. An inverted coordinate system (a second coordinate system) is a coordinate system used when the image capturing apparatus 100 is panned or tilted counterclockwise when installed on the ground or when installed on the ceiling, as shown in the FIGS. 2A to 2D. Note that the image capturing apparatus 100 can dynamically switch between the upright coordinate system and the inverted coordinate system. Switching of the coordinate system is a control in which the PT direction of the image capturing apparatus 100 is caused to coincide with the operation direction of the joystick by the user. As an example of switching of the coordinate system, the operation direction (downward direction) of the joystick by the user and the tilt direction (downward direction) of the image capturing apparatus 100 are caused to coincide.

In FIG. 2A, the pan value takes a positive value (angle) ranging from 0° to +180° in a clockwise direction when the image capturing apparatus 100 is viewed from above. On the other hand, the pan value takes a negative value (angle) ranging from 0° to −180° in a counterclockwise direction when the image capturing apparatus 100 is viewed from above. A pan direction 109 is a pannable direction of the image capturing apparatus 100.

In FIG. 2B, the tilt value takes a positive value (angle) ranging from 0° to +220° in a clockwise direction when the image capturing apparatus 100 is viewed from the left side surface (the surface of the image capturing apparatus 100 viewed from the direction of −90° in FIG. 2A). On the other hand, the tilt value takes a negative value (angle) ranging from 0° to −40° in a counterclockwise direction when the image capturing apparatus 100 is viewed from the left side surface. A tilt direction 110 is a tiltable direction of the image capturing apparatus 100.

In FIG. 2C, the pan value takes a negative value (angle) ranging from 0° to −180° in a clockwise direction when the image capturing apparatus 100 is viewed from below. On the other hand, the pan value takes a positive value (angle) ranging from 0° to +180° in a counterclockwise direction when the image capturing apparatus 100 is viewed from below. The pan direction 109 is a pannable direction of the image capturing apparatus 100.

In FIG. 2D, the tilt value takes a positive value (angle) ranging from 0° to +40° in a clockwise direction when the image capturing apparatus 100 is viewed from the left side surface (the surface of the image capturing apparatus 100 viewed from the direction of +90° in FIG. 2C). On the other hand, the tilt value takes a negative value (angle) ranging from 0° to −220° in a counterclockwise direction when the image capturing apparatus 100 is viewed from the left side surface. The tilt direction 110 is a tiltable direction of the image capturing apparatus 100.

Note that the zoom value of the image capturing apparatus 100 is calculated from the focal length of a lens 105.

Figure 12:
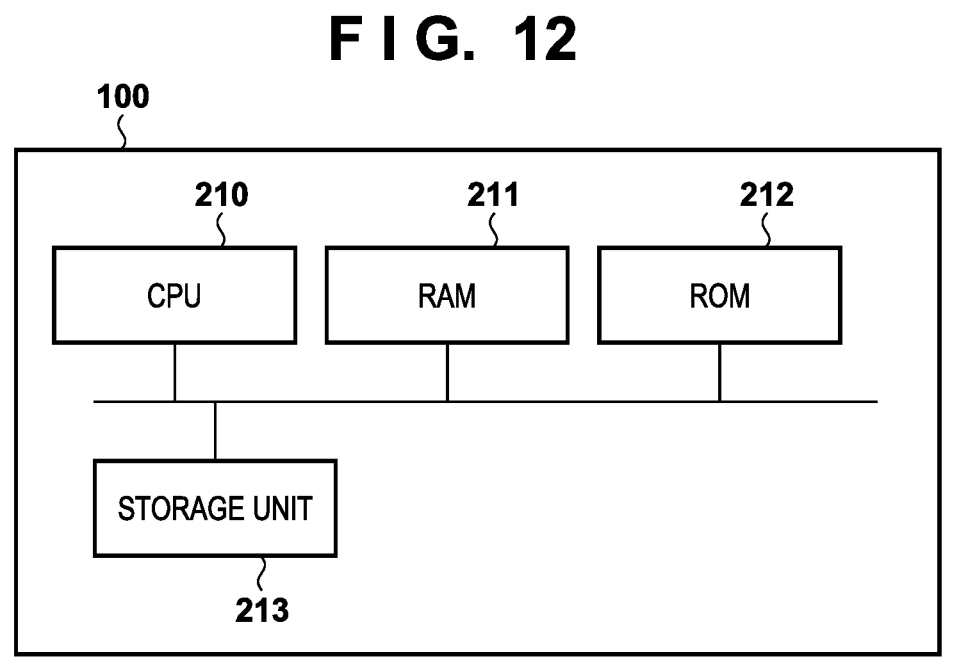

FIG. 12 is a view illustrating a hardware configuration of an image capturing apparatus according to the first embodiment.

The image capturing apparatus 100 includes a CPU 210, a RAM 211, a ROM 212, and a storage unit 213.

The CPU 210 is a central processing unit and controls each unit of the image capturing apparatus 100.

The RAM 211 is a memory for temporarily storing a computer program executed by the CPU 210, and is, for example, a volatile memory such as an SRAM or a DRAM.

The ROM 212 is a memory for storing programs for the CPU 210 to control each unit of the image capturing apparatus 100, and is, for example, a nonvolatile memory such as an EPROM.

The storage unit 213 is an apparatus that stores programs and video data, and includes, for example, a Hard Disk Drive (HDD) or a Solid State Drive (SSD).

FIG. 3 is a block diagram for describing functions of the image capturing apparatus according to the first embodiment. The functions of the image capturing apparatus 100 of FIG. 3 (other than hardware configuration blocks) are realized by the CPU 210 executing programs of the ROM 212.

The image capturing apparatus 100 includes an image processing unit 112, a system control unit 113, a PTZ control unit 114, an output unit 116, a control communication unit 117, and a network communication unit 118. Note that the image capturing apparatus 100 includes, as hardware configurations, the lens 105, a lens driving unit 106, a pan driving unit 107, a tilt driving unit 108, an image capturing unit 111, and the storage unit 213.

The direction of the subject side on the optical axis of the lens 105 is the image capturing direction of the image capturing apparatus 100. The light flux that has passed through the lens 105 forms an image on the image capturing element of the image capturing unit 111 of the image capturing apparatus 100.

The lens driving unit 106 consists of an element for driving the lens 105, and changes the focal length of the lens 105. The lens driving unit 106 is controlled by the PTZ control unit 114.

The pan driving unit 107 consists of a mechanical driving unit (for example, a gear) and a driving source (for example, a motor). The pan driving unit 107 drives the image capturing direction of the image capturing apparatus 100 in the pan direction 109 of FIG. 2A or FIG. 2C. Also, the pan driving unit 107 is controlled by the PTZ control unit 114.

The tilt driving unit 108 consists of a mechanical driving unit (for example, a gear) and a driving source (for example, a motor). The tilt driving unit 108 drives the image capturing direction of the image capturing apparatus 100 in the tilt direction 110 of FIG. 2B or FIG. 2D. Also, the tilt driving unit 108 is controlled by the PTZ control unit 114.

The image capturing unit 111 includes an image capturing element such as a charged coupled device (CCD) sensor or a complementary metal oxide semiconductor (CMOS) sensor. Also, the image capturing unit 111 generates an electric signal by photoelectrically converting the subject image formed through the lens 105.

The image processing unit 112 generates image data by performing image processing such as processing for converting an electric signal from the image capturing unit 111 into a digital signal and compression encoding processing. Also, the image processing unit 112 performs processing (i.e., auto-flipping) of rotating a still image (hereinafter referred to as an image) constituting a video by 180° based on an instruction from the system control unit 113. The image processing unit 112 of the present embodiment performs processing of rotating an image by 180°, but may also perform processing of rotating an image at an arbitrary angle such as a 90° rotation or a 270° rotation, for example, according to the image capturing state of the subject. The image processing unit 112 performs On-Screen Display (OSD) processing for superimposing character information on an image.

The system control unit 113 controls each unit of the image capturing apparatus 100. The system control unit 113 analyzes a control command of the image capturing apparatus 100 from the controller 300 or the information processing apparatus 500. In addition, the system control unit 113 transmits a control command including PTZ values to the PTZ control unit 114. The system control unit 113 transmits, to the image processing unit 112, an instruction to perform image quality adjustment when image data is generated, processing for 180° rotation of an image, and processing for superimposing character information on an image.

The PTZ control unit 114 controls the PTZ of the image capturing apparatus 100 by controlling the pan driving unit 107, the tilt driving unit 108, and the lens driving unit 106 based on an instruction from the system control unit 113.

The storage unit 213 stores (holds) an image quality setting parameter, PTZ values, and the installation state of the image capturing apparatus 100, for example. The installation state of the image capturing apparatus 100 encompasses an on-ground installation state and a ceiling installation state.

The output unit 116 outputs a signal obtained by converting a video from the image processing unit 112 into a predetermined video format to the display apparatus 200 and a distribution destination device via the first output terminal 101 and the second output terminal 102. In the present embodiment, the output unit 116 transmits a video from the first output terminal 101 to the device of the distribution destination, and transmits a video from the second output terminal 102 to the display apparatus 200, but the present embodiment is not limited to this. For example, the output unit 116 may transmit a video for operation 700 and a video for distribution 800 from the first output terminal 101 to the display apparatus 200. As a result, the user can confirm both the video for operation 700 and the video for distribution 800 on the screen of the display apparatus 200, thereby making it easier to recognize an occurrence of auto-flip.

The control communication unit 117 transmits various instructions from the controller 300 to the system control unit 113 via the control communication terminal 103.

The network communication unit 118 communicates with the information processing apparatus 500 via the I/F 104. For example, the network communication unit 118 transmits an image captured by the image capturing apparatus 100 to the information processing apparatus 500 via the network 400. In addition, the network communication unit 118 transmits the control command of the image capturing apparatus 100 received from the information processing apparatus 500 to the system control unit 113.

FIG. 4A to FIG. 4E is a view for describing auto-flipping executed by the image capturing apparatus. The image capturing apparatus 100, when installed on a ceiling, captures an image of a subject while changing the tilt value in a range of 0° to −220°. In a case where the image capturing direction is within a predetermined tilt value range, the image capturing apparatus 100 performs auto-flipping of the video for operation 700 and the video for distribution 800. Hereinafter, the direction in which the user operates the joystick 301 and the changes in each video will be described.

Figure 4:
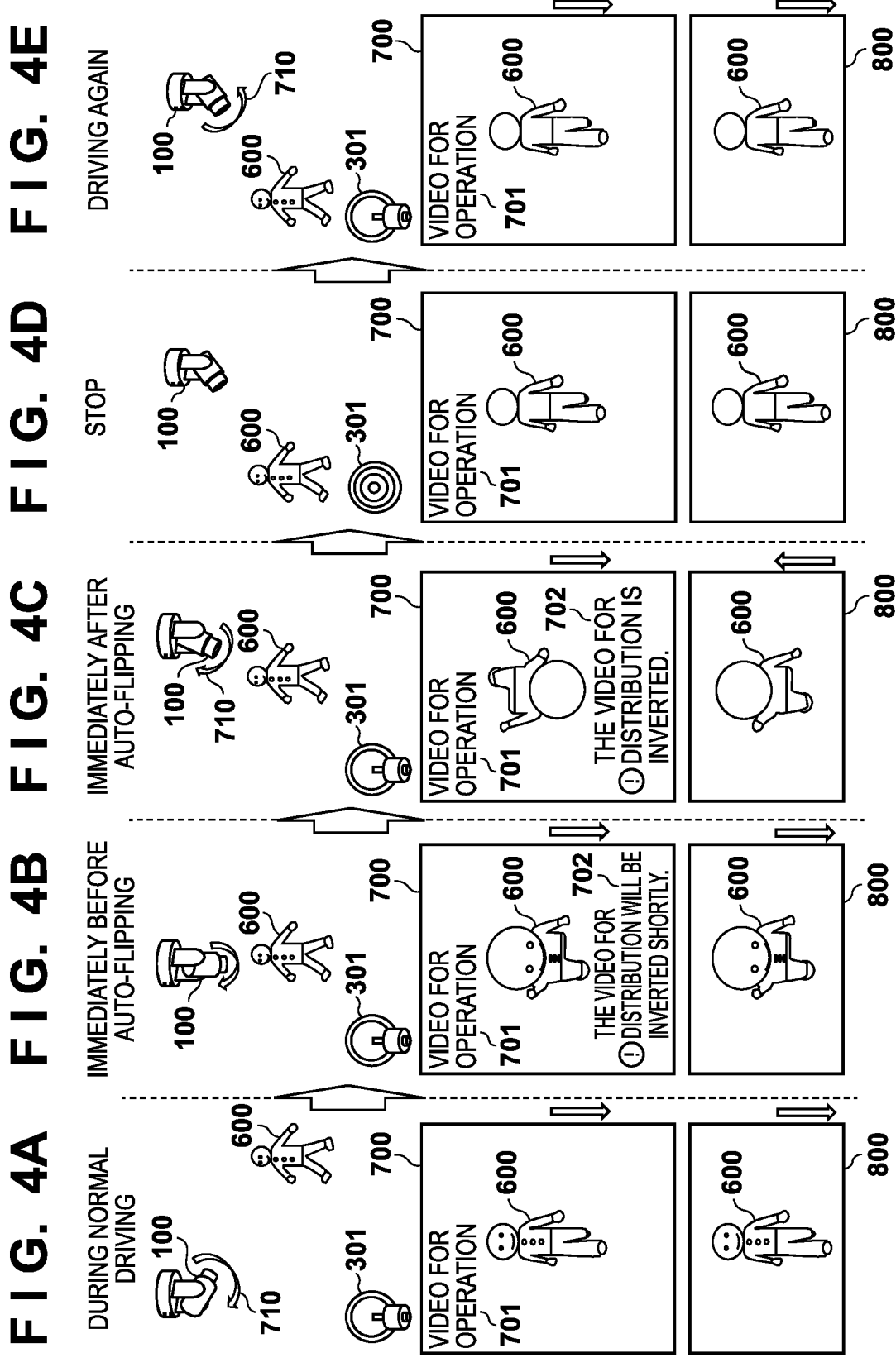
FIG. 4A to FIG. 4E are views for describing auto-flipping executed by the image capturing apparatus.

FIG. 4A to FIG. 4E illustrates an operation of the image capturing apparatus 100, the video for operation 700, and the video for distribution 800 divided into FIG. 4A during normal driving, FIG. 4B immediately before auto-flipping, FIG. 4C immediately after auto-flipping, FIG. 4D stopped, and FIG. 4E driving again.

The video for operation 700 is a video displayed on the display apparatus 200 via the second output terminal 102. The user operates the joystick 301 while confirming the video for operation 700 of the display apparatus 200. An identification display 701 and a warning display 702 are displayed superimposed on the video for operation 700 as OSD information. The identification display 701 displays that the video is the video for operation 700 and displays "video for operation" on the video for operation 700. The warning display 702 is a text message to be displayed on the video for operation 700. Note that a black arrow at the lower right of the video for operation 700 indicates the direction in which the image capturing range moves. For example, a downward black arrow at the lower right of the video for operation 700 in FIG. 4A indicates that the image capturing range moves in the downward direction.

The video for distribution 800 is a video distributed to an external apparatus (not shown) via the first output terminal 101. Note that a black arrow at the lower right of the video for distribution 800 indicates the direction in which the image capturing range moves. For example, a downward black arrow at the lower right of the video for distribution 800 in FIG. 4A indicates that the image capturing range moves in the downward direction.

In FIG. 4A, since the user tilts the joystick 301 in the downward direction, the image capturing apparatus 100 tilts in the direction of an arrow 710. Here, the image processing unit 112 does not execute auto-flipping (180° rotation processing) on the video for distribution 800. Assuming that the tilt value (angle) of the image capturing apparatus 100 is θt, the tilt value of the image capturing apparatus 100 in FIG. 4A takes a value in a range of $-80° \leq θt \leq 0°$.

In FIG. 4B, the user continues to tilt the joystick 301 in the downward direction, and the image capturing apparatus 100 is tilted in the vertical direction (tilt value θt=−90°). Here, the image processing unit 112 performs processing for superimposing a notification message of "The video for distribution will be inverted shortly." onto the video for operation 700 as the warning display 702.

Then, the output unit 116 outputs the video for operation 700 on which the warning display 702 is superimposed to the display apparatus 200. Note that the tilt value of the image capturing apparatus 100 in FIG. 4B takes a value in the range of $-100°<\theta t<-80°$.

In FIG. 4C, the user continues to tilt the joystick 301 in the downward direction and the image capturing apparatus 100 tilts further in the direction of an arrow 710. Here, in a case where the tilt value (angle) is a predetermined value, the image processing unit 112 performs auto-flipping (180° rotation processing) on the video for distribution 800. Thus, the video for distribution 800 is rotated by 180°, but the video for operation 700 is not rotated. Note that the tilt value of the image capturing apparatus 100 in FIG. 4C takes a value in the range of $\theta t\leq-100°$.

Also, the image processing unit 112 performs processing for superimposing a notification message of "The video for distribution is inverted." onto the video for operation 700 as the warning display 702.

Then, the output unit 116 outputs the video for operation 700 on which the warning display 702 is superimposed to the display apparatus 200. Here, since the black arrow at the lower right of the video for distribution 800 is upward, the direction in which the user operates the joystick 301 (downward direction) and the direction in which the image capturing range moves (upward direction) are opposite to each other. Therefore, the user needs to operate the joystick 301 while being conscious of the fact that the operation direction of the joystick 301 and the movement direction of the image capturing range are opposite to each other. For example, in a case where the user operates the joystick 301 by confirming the video for distribution 800 instead of the video for operation 700, the user will feel that it is difficult to intuitively operate the joystick 301.

On the other hand, since the black arrow at the lower right of the video for operation 700 is downward facing, the direction in which the user operates the joystick 301 (downward direction) and the direction in which the image capturing range moves (downward direction) are the same as each other. Therefore, the user can intuitively operate the joystick 301 while confirming the video for operation 700 even without being conscious of the direction in which the image capturing range moves.

In FIG. 4D, the user returns the position of the joystick 301 to the home position (neutral state), and the image capturing apparatus 100 stops tilting. Here, the image processing unit 112 performs auto-flipping (180° rotation processing) on the video for operation 700. As a result, a subject 600 of the video for operation 700 and the video for distribution 800 have the same framing. Further, the image processing unit 112 performs control not to display the warning display 702 superimposed on the video for operation 700. Accordingly, the warning display 702 is not displayed on the video for operation 700. Further, the system control unit 113 performs control for switching the coordinate system from the inverted coordinate system to the upright coordinate system. Note that the tilt value of the image capturing apparatus 100 in FIG. 4D takes a value in the range of $\theta t\leq-100°$.

In FIG. 4E, since the user again tilts the joystick 301 in the downward direction, the image capturing apparatus 100 tilts in the direction of an arrow 710. On the other hand, since the black arrow at the lower right of the video for operation 700 is downward, the direction in which the user operates the joystick 301 (downward direction) and the direction in which the image capturing range moves (downward direction) are the same as each other. Therefore, the user can intuitively operate the joystick 301 while confirming the video for operation 700 without recognizing the direction in which the image capturing range moves. Note that the tilt value of the image capturing apparatus 100 in FIG. 4E takes a value in a range of $\theta t\leq80°$ when the horizontal direction on the subject 600 side is the tilt value $\theta t=0°$.

Figure 5:
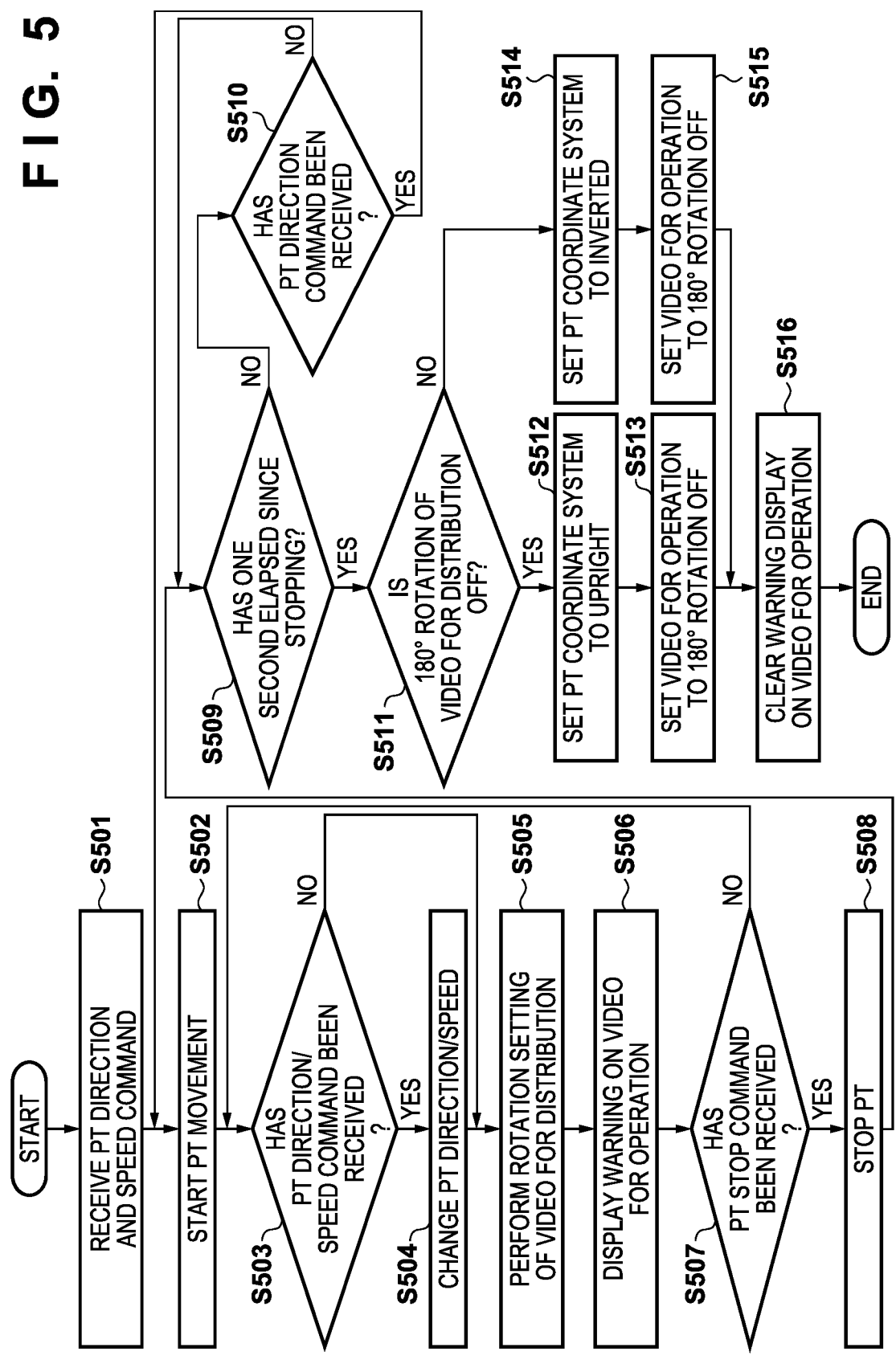
FIG. 5 a flowchart for describing auto-flipping executed by the image capturing apparatus.

FIG. 5 a flowchart for describing auto-flipping executed by the image capturing apparatus. "PT" described in each step of FIG. 5 represents pan and tilt. Hereinafter, for ease of description, auto-flipping based on the tilt direction and the tilt speed of the image capturing apparatus 100 will be described. Note, since auto-flipping based on the pan direction and the pan speed is the similar to the case of tilting, description thereof will be omitted.

In step S501, the system control unit 113 receives a control command specifying the tilt direction and the tilt speed from the controller 300 or the information processing apparatus 500.

In step S502, the system control unit 113 starts control of the tilt driving unit 108 based on a control command specifying the tilt direction and the tilt speed. Here, the tilt control of the image capturing apparatus 100 in a case where the user operates the joystick 301 of the controller 300 in the downward direction will be described. As illustrated in FIG. 4A, the operation direction (downward direction) of the joystick 301 is the same as the direction (downward direction) of the black arrow at the lower right of the video for operation 700 and the video for distribution 800.

In step S503, the system control unit 113 determines whether or not the control command specifying the tilt direction and the tilt speed has been received. In a case where the system control unit 113 has determined that the control command specifying the tilt direction and the tilt speed has been received (Yes in step S503), the process advances to step S504. On the other hand, in a case where the system control unit 113 has determined that the control command specifying the tilt direction and the tilt speed has not been received (No in step S503), the process advances to step S505.

In step S504, the system control unit 113 controls changing of the tilt direction and the tilt speed based on a control command specifying the tilt direction and the tilt speed.

In step S505, the image processing unit 112 performs 180° rotation processing on the video for distribution 800. Note, the rotation processing of the video for distribution 800 will be described later with reference to FIG. 6.

In step S506, the image processing unit 112 performs processing for superimposing the warning display 702 on the video for operation 700. Processing for superimposing the warning display 702 on the video for operation 700 will be described later with reference to FIG. 7.

In step S507, the system control unit 113 determines whether or not a control command to stop tilting has been received. Note, the control command to stop tilting is transmitted from the controller 300 or the information processing apparatus 500 similar to the control command specifying the tilt direction and the tilt speed. In a case where the system control unit 113 has determined that the control command to stop tilting has been received (Yes in step S507), the processing advances to step S508. On the other hand, in a case where the system control unit 113 has determined that the control command to stop tilting has not been received (Yes in step S507), the processing returns to step S503.

In step S508, the system control unit 113 performs control for stopping tilting of the image capturing apparatus 100.

In step S509, the system control unit 113 determines whether or not one second or more has elapsed since the tilting of the image capturing apparatus 100 has been stopped. In a case where the system control unit 113 has determined that one second or more has elapsed since the tilting of the image capturing apparatus 100 has been stopped (Yes in step S509), the processing advances to step S511. In a case where the system control unit 113 has determined that one second or more has not elapsed since the tilting of the image capturing apparatus 100 has been stopped (No in step S509), the processing advances to step S510.

In step S510, the system control unit 113 determines whether or not a control command for tilting the image capturing apparatus 100 has been received. In a case where the system control unit 113 has determined that the control command for tilting the image capturing apparatus 100 has been received (Yes in step S510), the processing returns to step S502. In a case where the system control unit 113 has determined that the control command for tilting the image capturing apparatus 100 has been received (Yes in step S510), the processing returns to step S509.

The reason for performing the processing of step S509 to step S510 will be described. Immediately after the tilting of the image capturing apparatus 100 is stopped, the user may operate the joystick 301 to correct the tilt of the image capturing apparatus 100. Therefore, if the PT coordinate system is inverted immediately after the tilting of the image capturing apparatus 100 is stopped, the user operates the joystick 301 while viewing the video for operation 700 rotated by 180°. Note, the PT coordinate system refers to the upright coordinate system and the inverted coordinate system of the image capturing apparatus 100 described in FIGS. 2A to 2D. Since the direction in which the user operates the joystick 301 and the movement direction in the image capturing range of the video for operation 700 are opposite, the user will feel that it is difficult to perform tilt control for the image capturing apparatus 100 in the intended image capturing direction. As described above, auto-flipping of the video for operation 700 is not performed immediately after the tilting of the image capturing apparatus 100 has stopped; rather, auto-flipping of the video for operation 700 is performed after one second has elapsed from when the tilting has stopped. As a result, usability when performing tilt control of the image capturing apparatus 100 improves. Note that the waiting time from the stopping of the tilting of the image capturing apparatus 100 to the auto-flipping of the video for operation 700 is one second, but it may be any waiting time.

In step S511, the system control unit 113 determines whether or not the setting of the 180° rotation processing for the video for distribution 800 is OFF (set to not perform 180° rotation processing). In a case where the system control unit 113 determines that the setting of the 180° rotation processing of the video for distribution 800 is OFF (Yes in step S511), the process advances to step S512. On the other hand, in a case where the system control unit 113 has determined that the setting of the 180° rotation processing for the video for distribution 800 is not OFF (set to perform 180° rotation processing) (No in step S511), the processing advances to step S514.

In step S512, the system control unit 113 sets PT coordinate system to the upright coordinate system.

In step S513, the system control unit 113 sets the setting of the 180° rotation processing for the video for operation 700 to OFF (in other words, set to not perform 180° rotation processing).

In step S514, the system control unit 113 sets PT coordinate system to the inverted coordinate system.

In step S515, the system control unit 113 sets the setting of the 180° rotation processing for the video for operation 700 to ON (in other words, set to perform 180° rotation processing).

In step S516, the system control unit 113 performs control not to display the warning display 702 superimposed on the video for operation 700. Updating of the warning display 702 will be described later with reference to FIG. 7.

FIG. 6 is view illustrating auto-flip settings for video for distribution according to the first embodiment.

First, a setting when the image capturing apparatus 100 performs 180° rotation processing (auto-flipping) on the video for distribution 800 at a time of an on-ground installation will be described.

In a case where the tilt value $\theta t$ in the upright coordinate system is $80° \leq \theta t$, the system control unit 113 determines that the setting of the 180° rotation processing of the video for distribution 800 is OFF. In this case, the image processing unit 112 does not perform 180° rotation processing on the video for distribution 800.

In a case where the tilt value $\theta t$ in the upright coordinate system is in the range of $80° < \theta t < 100°$, the system control unit 113 determines that the setting of the 180° rotation processing of the video for distribution 800 is OFF. In this case, the image processing unit 112 does not perform 180° rotation processing on the video for distribution 800. Note, in a case where tilt control of the image capturing apparatus 100 is performed based on a tilt value (threshold value) defined as a condition for performing auto-flipping, a "hunting phenomenon" occurs. A hunting phenomenon refers to a phenomenon in which 180° rotation (auto-flipping) of the video for distribution 800 frequently occurs near a threshold. Therefore, the system control unit 113 can avoid the hunting phenomenon by determining whether or not to perform the 180° rotation processing of the video for distribution 800 based on the range of the aforementioned tilt value $\theta t$.

In a case where the tilt value $\theta t$ in the upright coordinate system is $100° \leq \theta t$, the system control unit 113 determines that the setting of the 180° rotation processing of the video for distribution 800 is ON. In this case, the image processing unit 112 does perform 180° rotation processing on the video for distribution 800.

In a case where the tilt value $\theta t$ in the inverted coordinate system is $-100° \leq \theta t$, the system control unit 113 determines that the setting of the 180° rotation processing of the video for distribution 800 is ON. In this case, the image processing unit 112 does perform 180° rotation processing on the video for distribution 800.

In a case where the tilt value $\theta t$ in the inverted coordinate system is in the range of $-100° < \theta t < -80°$, the system control unit 113 determines that the setting of the 180° rotation processing of the video for distribution 800 is ON. In this case, the image processing unit 112 does perform 180° rotation processing on the video for distribution 800. Therefore, the system control unit 113 can avoid the hunting phenomenon by determining whether or not to perform the 180° rotation processing of the video for distribution 800 based on the range of the aforementioned tilt value $\theta t$.

In a case where the tilt value $\theta t$ in the inverted coordinate system is $-80° \leq \theta t$, the system control unit 113 determines that the setting of the 180° rotation processing of the video for distribution 800 is OFF. In this case, the image processing unit 112 does not perform 180° rotation processing on the video for distribution 800.

Next, a setting when the image capturing apparatus 100 performs 180° rotation processing (auto-flipping) on the video for distribution 800 when installed on a ceiling will be described.

In a case where the tilt value θt in the upright coordinate system is θt≤80°, the system control unit 113 determines that the setting of the 180° rotation processing of the video for distribution 800 is ON. In this case, the image processing unit 112 does perform 180° rotation processing on the video for distribution 800.

In a case where the tilt value θt in the upright coordinate system is in the range of 80°≤θt≤100°, the system control unit 113 determines that the setting of the 180° rotation processing of the video for distribution 800 is ON. In this case, the image processing unit 112 does perform 180° rotation processing on the video for distribution 800. Therefore, the system control unit 113 can avoid the hunting phenomenon by determining whether or not to perform the 180° rotation processing of the video for distribution 800 based on the range of the aforementioned tilt value θt.

In a case where the tilt value θt in the upright coordinate system is 100°≤θt, the system control unit 113 determines that the setting of the 180° rotation processing of the video for distribution 800 is OFF. In this case, the image processing unit 112 does not perform 180° rotation processing on the video for distribution 800.

In a case where the tilt value θt in the inverted coordinate system is −100°≤θt, the system control unit 113 determines that the setting of the 180° rotation processing of the video for distribution 800 is OFF. In this case, the image processing unit 112 does not perform 180° rotation processing on the video for distribution 800.

In a case where the tilt value θt in the inverted coordinate system is in the range of −100°<θt<−80°, the system control unit 113 determines that the setting of the 180° rotation processing of the video for distribution 800 is OFF. In this case, the image processing unit 112 does not perform 180° rotation processing on the video for distribution 800. Therefore, the system control unit 113 can avoid the hunting phenomenon by determining whether or not to perform the 180° rotation processing of the video for distribution 800 based on the range of the aforementioned tilt value θt.

In a case where the tilt value θt in the inverted coordinate system is −80°≤θt, the system control unit 113 determines that the setting of the 180° rotation processing of the video for distribution 800 is ON. In this case, the image processing unit 112 does perform 180° rotation processing on the video for distribution 800.

Figure 7:
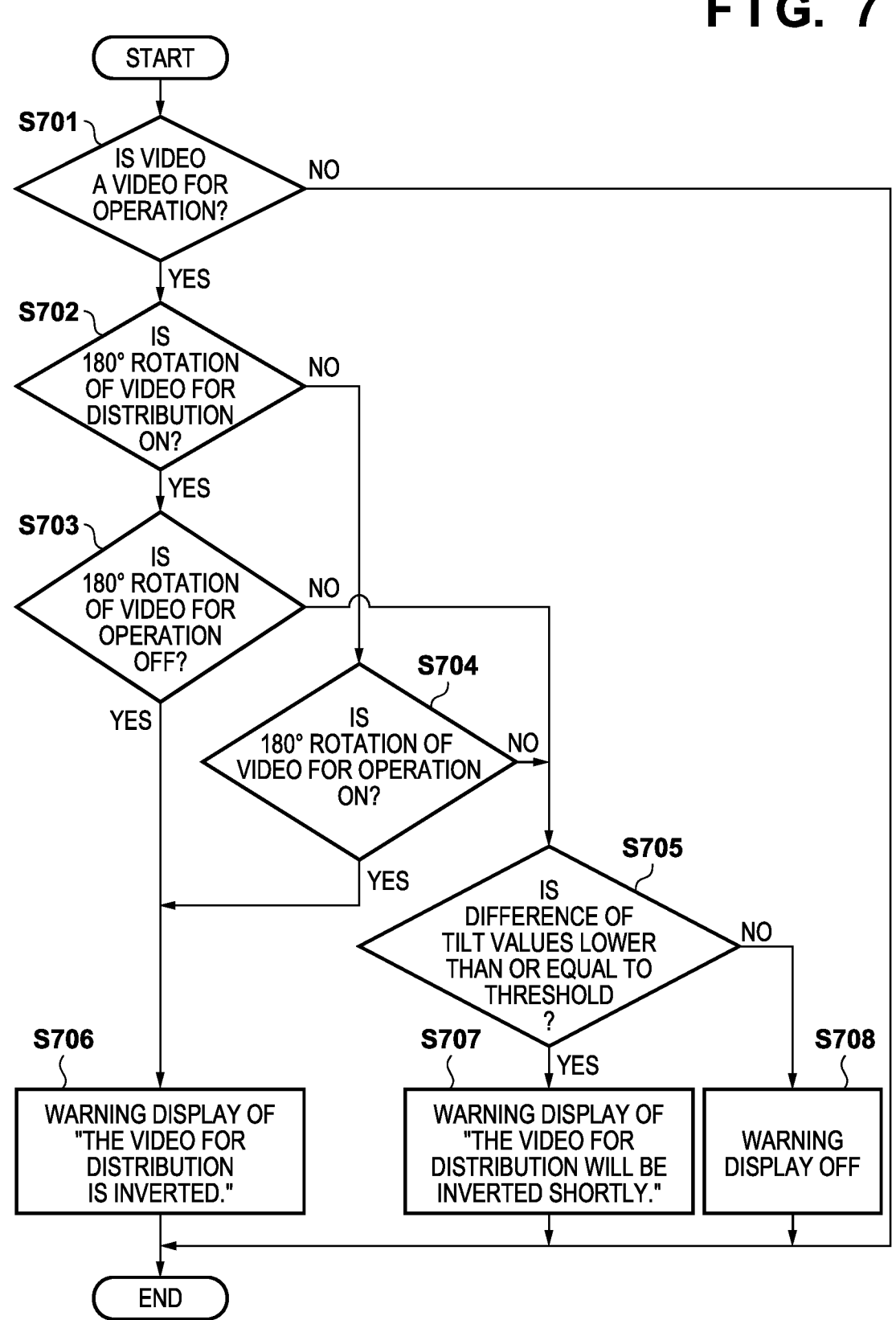
FIG. 7 is a flowchart for describing OSD display processing according to the first embodiment.

FIG. 7 is a flowchart for describing OSD display processing according to the first embodiment.

In step S701, the system control unit 113 determines whether or not the obtained video is the video for operation 700. In a case where the system control unit 113 determines that the obtained video is the video for operation 700 (Yes in step S701), the processing advances to step S702. In a case where the system control unit 113 determines that the obtained video is not the video for operation 700 (No in step S701), the processing ends.

In step S702, the system control unit 113 determines whether or not the setting of 180° rotation processing for the video for distribution 800 is ON (a setting for performing 180° rotation processing). In a case where the system control unit 113 determines that the setting of the 180° rotation processing of the video for distribution 800 is ON (Yes in step S702), the process advances to step S703. In a case where the system control unit 113 determines that the setting of the 180° rotation processing of the video for distribution 800 is not ON (No in step S702), the process advances to step S704.

In step S703, the system control unit 113 determines whether or not the setting of the 180° rotation processing for the video for operation 700 is OFF (set to not perform 180° rotation processing). In a case where the system control unit 113 determines that the setting of the 180° rotation processing for the video for operation 700 is OFF (Yes in step S703), the processing advances to step S706. In a case where the system control unit 113 determines that the setting of the 180° rotation processing for the video for operation 700 is not OFF (No in step S703), the processing advances to step S705.

In step S704, the system control unit 113 determines whether or not the setting of the 180° rotation processing for the video for operation 700 is ON. In a case where the system control unit 113 determines that the setting of the 180° rotation processing for the video for operation 700 is ON (Yes in step S703), the processing advances to step S706. In a case where the system control unit 113 determines that the setting of the 180° rotation processing for the video for operation 700 is not ON (No in step S703), the processing advances to step S705.

In step S705, the system control unit 113 determines whether or not a difference between the present tilt value θt and the predetermined tilt value (tilt value at the time of performing auto-flipping) is equal to or less than a predetermined threshold. In a case where the system control unit 113 has determined that the difference is equal to or less than the predetermined threshold (Yes in step S705), the processing advances to step S707. In a case where the system control unit 113 has determined that the difference is not equal to or less than the predetermined threshold (No in step S705), the processing advances to step S708.

Here, the predetermined threshold value is 10°. For example, in the image capturing apparatus 100 at the time of an on-ground installation, the predetermined tilt value in the upright coordinate system is 100°. Therefore, in a case where the current tilt value θt is between 90° to 100°, the system control unit 113 determines that the difference (0° to 10°) is equal to or less than the predetermined threshold (10°). As described above, the system control unit 113 determines the degree of proximity of the current tilt value θt to the predetermined tilt value, but other determination methods may be used.

In step S706, the system control unit 113 performs processing for superimposing a message of "The video for distribution is inverted." as the warning display 702 on the video for operation 700.

In step S707, the system control unit 113 performs processing for superimposing a message of "The video for distribution will be inverted shortly." as the warning display 702 on the video for operation 700.

In step S708, the system control unit 113 does not perform processing for superimposing the warning display 702 on the video for operation 700.

FIG. 8 is a flowchart for describing auto-flipping according to the first embodiment. "PT" described in each step of FIG. 8 represents pan and tilt. Hereinafter, for ease of description, auto-flipping based on the tilt direction and the tilt speed of the image capturing apparatus 100 will be described. Note, since auto-flipping based on the pan direction and the pan speed is the similar to the case of tilting, description thereof will be omitted.

The image capturing apparatus 100 can be driven not only based on a control command specifying a tilt direction and a tilt speed, but also based on a control command specifying a target tilt value. Note, the target tilt value corresponds to the target tilt direction.

For example, the target tilt value of the image capturing apparatus 100 may be directly specified via a UI on the screen of the information processing apparatus 500. This method corresponds to a method of driving the image capturing apparatus 100 to a target tilt value by calling a preset registered in the image capturing apparatus 100.

In the above-described method, since tilt control is not performed for the image capturing apparatus 100 through the joystick 301, usability does not decrease even in a case where the video for operation 700 is in the process of being inverted (rotated by 180°). Therefore, the video for operation 700 and the video for distribution 800 are subjected to auto-flipping (180° rotation processing) at the same timing. Further, the processing of superimposing the warning display 702 on the video for operation 700 is not necessary. Hereinafter, a method of performing tilt control of the image capturing apparatus 100 without using the joystick 301 will be described.

In step S801, the system control unit 113 receives a control command to specify a tilt value. Note, the control command to specify the tilt value is transmitted from the controller 300 or the information processing apparatus 500 similar to the control command specifying the tilt direction and the tilt speed. Also, in a case where the system control unit 113 receives the preset call command, the preset call command is converted into a control command specifying the tilt value within the image capturing apparatus 100.

In step S802, the system control unit 113 controls the tilt driving unit 108 based on the target tilt value of the received control command.

In step S803, the system control unit 113 determines whether or not the control command to specify a tilt value has been received. In a case where the system control unit 113 has determined that the control command to specify the tilt value has been received (Yes in step S803), the processing advances to step S804. In a case where the system control unit 113 has determined that the control command to specify the tilt value has not been received (No in step S803), the processing advances to step S805.

In step S804, the system control unit 113 updates the target tilt value based on the received control command, but changes the tilt direction and the tilt speed as needed.

In step S805, the system control unit 113 switches the setting (ON/OFF) of the 180° rotation processing for the video for operation 700 and the video for distribution 800 based on whether or not the present tilt value exceeds the predetermined tilt value. In this case, if the image capturing apparatus 100 is driven based on a target tilt value specified in advance, the tilt of the image capturing apparatus 100 is not changed frequently. Here, the predetermined tilt value (angle) is, for example, 100° in an upright coordinate system at the time of an on-ground installation, and −100° in an inverted coordinate system.

In step S806, the system control unit 113 determines whether or not the present tilt value is the same as the target tilt value, or whether or not a tilt stop command has been received. In a case where the system control unit 113 determines that the present tilt value is not the same as the target tilt value and that the tilt stop command has not been received (No in step S806), the processing advances to step S803. In a case where the system control unit 113 determines that the present tilt value is the same as the target tilt value or that the tilt stop command has been received (Yes in step S806), the processing advances to step S807.

In step S808, the system control unit 113 determines whether or not the setting of the 180° rotation processing for the video for distribution 800 is OFF. In a case where the system control unit 113 determines that the setting of the 180° rotation processing of the video for distribution 800 is OFF (Yes in step S808), the process advances to step S809. In a case where the system control unit 113 determines that the setting of the 180° rotation processing of the video for distribution 800 is not OFF (No in step S808), the process advances to step S810.

In step S809, the system control unit 113 sets PT coordinate system to the upright coordinate system and then ends the processing.

In step S810, the system control unit 113 sets PT coordinate system to the inverted coordinate system and then ends the processing.

Figure 9:
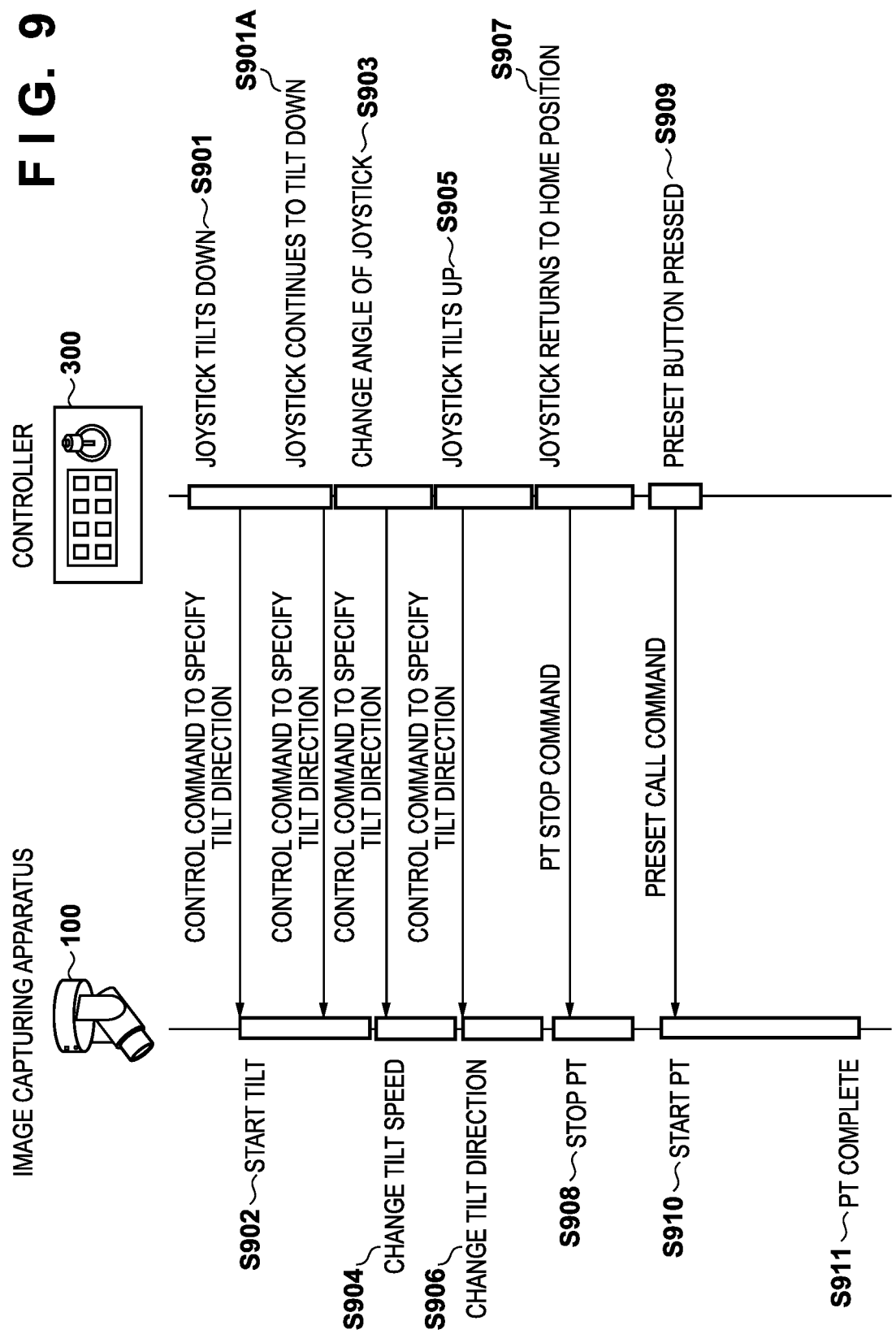
FIG. 9 is a view illustrating a control communication sequence according to the first embodiment.

With reference to FIGS. 9 to 11, a mechanism of control communication when the controller 300 controls the PT of the image capturing apparatus 100 will be described. A control communication command is a command system defined by the protocol of VISCA (registered trademark), but is not limited thereto.

FIG. 9 is a view illustrating a control communication sequence according to the first embodiment.

In step S901 to S901A, the user tilts the joystick 301 of the controller 300 in the downward direction. The controller 300 transmits a control command to specify a tilt direction (downward direction) to the image capturing apparatus 100. The control command to specify the tilt direction includes a tilt direction (up or down) and a tilt speed parameter corresponding to the tilt angle of the joystick 301. Note, in a case where the joystick 301 is tilted obliquely, the controller 300 transmits a control command to specify the pan direction to the image capturing apparatus 100 together with a control command to specify the tilt direction.

In step S902, the image capturing apparatus 100 starts tilting based on the received control command. In addition, in a case where the tilt angle of the joystick 301 does not change, the controller 300 transmits a control command to specify the tilt direction at regular time intervals to the image capturing apparatus 100. However, even if the image capturing apparatus 100 further receives a control command, since the tilt has already started, the additional control command does not affect the tilt of the image capturing apparatus 100.

In a case where the tilt angle of the joystick 301 is changed in step S903, the controller 300 transmits a control command to specify the tilt speed corresponding to the tilt angle of the joystick 301 to the image capturing apparatus 100.

In step S904, the image capturing apparatus 100 changes the tilt speed from the present tilt speed to the tilt speed specified by the received control command based on the received control command, and continues the tilt.

In step S905, the user tilts the joystick 301 in the upward direction. The controller 300 transmits a control command to specify a tilt direction (upward direction) and a tilt speed to the image capturing apparatus 100.

In step S906, the image capturing apparatus 100 tilts in the upward direction based on the received control command.

In step S907, the user returns the joystick 301 to the home position (neutral position). The controller 300 transmits a tilt stop command to the image capturing apparatus 100.

In step S908, the image capturing apparatus 100 stops tilting based on the received tilt stop command.

In step S909, the user presses an arbitrary preset button from the control buttons 302 of the controller 300. The controller 300 transmits a preset call command to the image capturing apparatus 100. The preset call command includes parameters of the tilt direction and the tilt speed associated with the preset number.

In step S910, the image capturing apparatus 100 starts tilting so that the tilt value becomes the target tilt value corresponding to the preset number based on the received preset call command.

In a case where the image capturing apparatus 100 determines in step S911 that the present tilt value is the same as the target tilt value, the tilting is ended.

FIG. 10 is a view illustrating a packet structure used in the control communication according to the first embodiment.

The packet structure consists of a header, a command, and parameters.

The header includes an address representing a device of a transmission source of the packet, an address representing a device of a transmission destination, and data representing a size (number of bytes) of the packet.

The command represents a function of the image capturing apparatus 100 controlled by the packet.

The parameters represent detailed control contents of the command.

FIG. 11 is a view illustrating a command list used in the control communication according to the first embodiment.

In parameter 1 of a control command to specify a pan direction, the pan direction (left or right) of the image capturing apparatus 100 is specified. In parameter 2 of the control command to specify a pan direction, a pan speed of the image capturing apparatus 100 is specified.

In parameter 1 of a control command to specify a tilt direction, the tilt direction (up or down) of the image capturing apparatus 100 is specified. In parameter 2 of the control command to specify a tilt direction, a tilt speed of the image capturing apparatus 100 is specified.

In parameter 1 of a control command to specify a PT value, a pan value of the image capturing apparatus 100 is specified. In parameter 2 of a control command to specify a PT value, a tilt value of the image capturing apparatus 100 is specified.

Parameter 1 and parameter 2 are not specified in a PT stop command.

In parameter 1 of a preset registration command, a preset number at a time of registering PTZ values is specified.

In parameter 1 of a preset call command, a preset number at a time performing a preset call is specified.

As described above, according to the first embodiment, even if auto-flipping occurs during image capturing in a predetermined image capturing direction, usability when controlling the image capturing direction of the image capturing apparatus can be improved by outputting a video for operation and a video for distribution, respectively. This makes it possible to control the image capturing apparatus in an image capturing direction intended by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-098197, filed Jun. 17, 2022, which is hereby incorporated by reference herein in its entirety.

What is claimed is:

1. An image capturing apparatus comprising:
an image capturing unit having a sensor configured to capture an image of a subject;
at least one processor; and
at least one computer memory coupled to the at least one processor, the computer memory storing computer instructions that, when executed by the processor, cause the processor to act as:
an output unit configured to output a first output image and a second output image based on an image capture result of the subject by the image capturing unit, wherein the first output image is an image displayed to a user for an operation to change an image capturing direction of the image capturing unit and the second output image is an image outputted to an external apparatus for display,
the output unit, in a case where a predetermined condition including that an image capturing direction of the image capturing unit is within a predetermined range is satisfied, outputs a first image in which the image capturing unit has captured the subject as the first output image displayed to the user for the operation to change the image capturing direction of the image capturing unit, and simultaneously outputs to the external apparatus a second image in which the first image has been rotated as the second output image, and
further the output unit, in accordance with an instruction to stop changing the image capturing direction while the image capturing direction is within the predetermined range, changes the first output image to be output from the first image to the second image.

2. The image capturing apparatus according to claim 1, wherein the output unit, in a case where a predetermined time has elapsed after an instruction to stop changing the image capturing direction while the image capturing direction is within the predetermined range has been received, outputs the second image as the first output image.

3. The image capturing apparatus according to claim 1, wherein the computer instructions further cause the processor to act as: a control unit configured to change the image capturing direction by controlling a pan driving unit or a tilt driving unit of the image capturing apparatus based on a user operation for changing the image capturing direction in accordance with a coordinate system, wherein the control unit, after an instruction to stop changing the image capturing direction while the image capturing direction is within the predetermined range has been received, changes a coordinate system of the user operation.

4. The image capturing apparatus according to claim 1, wherein the output unit, in a case where the first image is outputted as the first output image and the image capturing direction is in a proximity of the predetermined range, outputs an image, in which a first display for making a notice that the second image will be outputted as the second output image has been superimposed on the first image, as the first output image.

5. The image capturing apparatus according to claim 4, wherein the output unit, in a case where the first image is being outputted as the first output image and the second image is being outputted as the second output image, outputs an image, in which a second display showing that the second image is being outputted as the second output image is superimposed on the first image, as the first output image.

6. The image capturing apparatus according to claim 3, wherein the computer instructions further cause the processor to act as: an accepting unit configured to accept a direction in which the image capturing direction will change or a target direction of the image capturing direction, wherein the control unit changes the image capturing direction based on the accepted direction or the target direction.

7. The image capturing apparatus according to claim 6, wherein the output unit, in a case where a predetermined condition including that an image capturing direction, at a time when the image capturing direction is changed to the target direction, is within a predetermined range is satisfied, outputs the second image as the first output image and the second output image.

8. The image capturing apparatus according to claim 7, wherein the output unit, in a case where a predetermined condition including that an image capturing direction, at a time when the image capturing direction is changed to the target direction, is within a predetermined range is satisfied, outputs the first image as the first output image and the second image as the second output image.

9. The image capturing apparatus according to claim 6, wherein the accepting unit further accepts a speed at a time when the image capturing direction changes.

10. The image capturing apparatus according to claim 3, wherein the computer instructions further cause the processor to act as: a storage unit configured to store the image capturing direction in the computer memory, wherein the control unit changes the image capturing direction to the stored image capturing direction.

11. The image capturing apparatus according to claim 1, wherein the output unit outputs the first output image and the second output image to a first external apparatus and a second external apparatus, respectively.

12. An image capturing system, comprising: the image capturing apparatus according to claim 1; a controller configured to control the image capturing direction based on a user operation; and a display apparatus configured to display the first output image or the first output image and the second output image.

13. A method comprising:

outputting a first output image and a second output image based on an image capture result of the subject by an image capturing apparatus, wherein the first output image is an image displayed to a user for an operation to change an image capturing direction of the image capturing apparatus and the second output image is an image outputted to an external apparatus for display, in a case where a predetermined condition including that an image capturing direction of the image capturing apparatus is within a predetermined range is satisfied, outputting a first image in which the image capturing apparatus has captured the subject as the first output image displayed to the user for the operation to change the image capturing direction of the image capturing unit, and simultaneously outputting to the external apparatus a second image in which the first image has been rotated as the second output image, and in accordance with an instruction to stop changing the image capturing direction while the image capturing direction is within the predetermined range, changing the first output image to be output from the first image to the second image.

14. A non-transitory computer-readable storage medium storing instructions that, when executed by a computer, cause the computer to perform a method comprising:

outputting a first output image and a second output image based on an image capture result of the subject by an image capturing apparatus, wherein the first output image is an image displayed to a user for an operation to change an image capturing direction of the image capturing apparatus and the second output image is an image outputted to an external apparatus for display, in a case where a predetermined condition including that an image capturing direction of the image capturing apparatus is within a predetermined range is satisfied, outputting a first image in which the image capturing apparatus has captured the subject as the first output image displayed to the user for the operation to change the image capturing direction of the image capturing unit, and simultaneously outputting to the external apparatus a second image in which the first image has been rotated as the second output image, and in accordance with an instruction to stop changing the image capturing direction while the image capturing direction is within the predetermined range, changing the first output image to be output from the first image to the second image.

* * * * *